United States Patent [19]

Hagemeister

[11] Patent Number: 4,698,888
[45] Date of Patent: Oct. 13, 1987

[54] METHOD FOR MASS PRODUCING SUPERIMPOSED ANNULAR ELEMENTS OF A TUBULAR MANIFOLD OR COLLECTOR VESSEL OF A HEAT EXCHANGER

[75] Inventor: Klaus Hagemeister, Munich, Fed. Rep. of Germany

[73] Assignee: MTU Motoren-und-Turbinen Union Munchen GmbH, Munich, Fed. Rep. of Germany

[21] Appl. No.: 812,278

[22] Filed: Dec. 23, 1985

[30] Foreign Application Priority Data

Dec. 22, 1984 [DE] Fed. Rep. of Germany ....... 3447145

[51] Int. Cl.[4] .................... B21D 53/02; B23P 15/26
[52] U.S. Cl. ........................ 29/157.3 R; 29/157.36; 29/157.4
[58] Field of Search ............... 29/157.3 R, 157.3 C, 29/157.4, 463, 727, DIG. 32; 72/133, 177, 180; 165/175, 176

[56] References Cited

U.S. PATENT DOCUMENTS

| | | | |
|---|---|---|---|
| 368,614 | 8/1887 | Pratt | 29/157.4 |
| 368,615 | 8/1887 | Pratt | 29/157.4 |
| 1,293,868 | 2/1919 | Murray | 29/157.4 |
| 1,337,590 | 5/1920 | Cain | 29/157.4 |
| 1,420,241 | 6/1922 | Cain | 29/157.4 |
| 4,597,436 | 7/1986 | Hagemeister | 29/157.4 |

Primary Examiner—Mark Rosenbaum
Assistant Examiner—Irene Graves Golobi
Attorney, Agent, or Firm—Roberts, Spiecens & Cohen

[57] ABSTRACT

A method for producing a collector vessel or manifold of a heat exchanger wherein the collector vessel is tubular and composed of a plurality of superimposed annular rings which are formed with recesses for receiving heat exchanger tubes of a matrix. The method comprises producing the annular rings from strips of predetermined profiled cross section by cutting the strips to predetermined length and rolling or coiling the strips and closing the rings by welding together their open ends. Thereafter a local displacement of material is achieved by rolling each of the closed rings and, in a subsequent rolling operation, in the plane of the ring, the material is deformed to produce recesses for the matrix tubes.

24 Claims, 18 Drawing Figures

FIG. 3
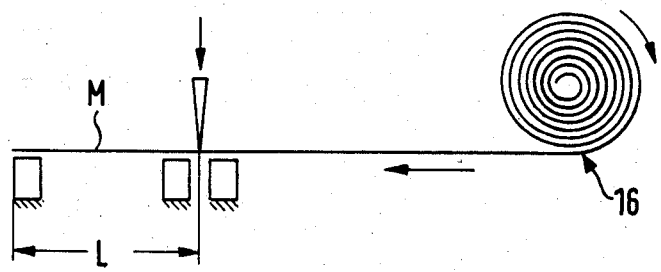
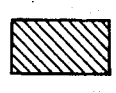
FIG. 4a
FIG. 4b
FIG. 4c
FIG. 4d
FIG. 4e
FIG. 5
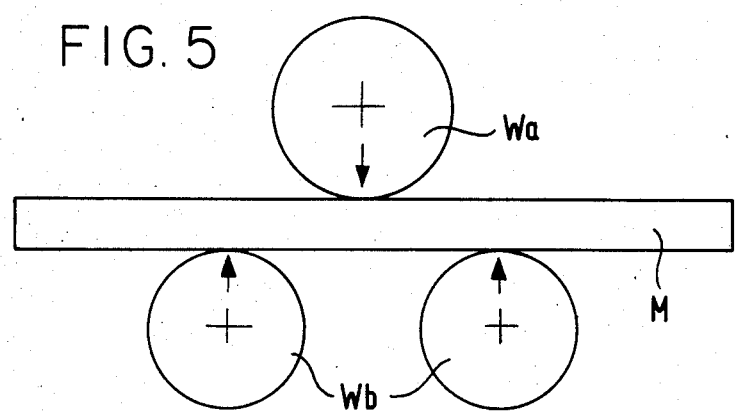

W1
W1 DIRECTION OF ROLLING

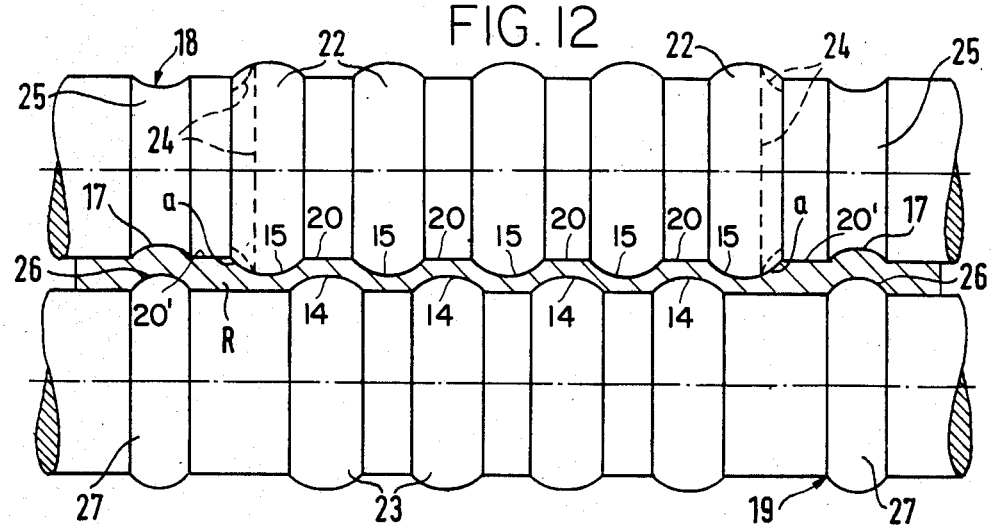
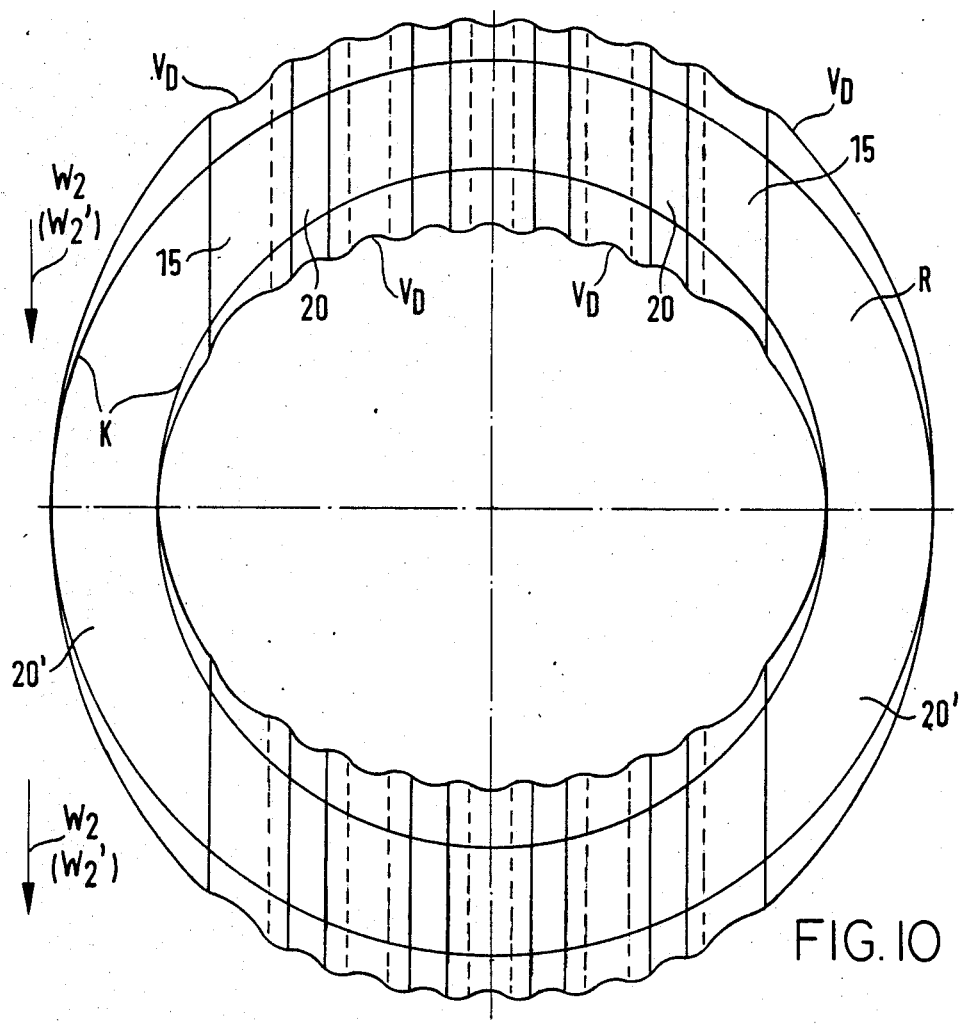

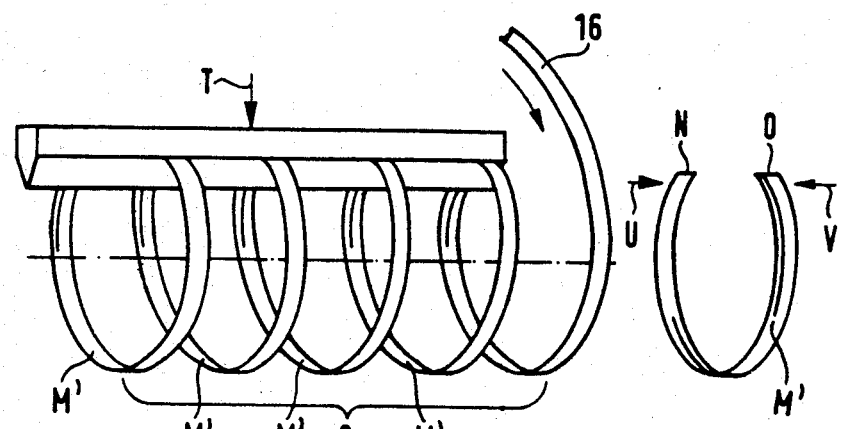
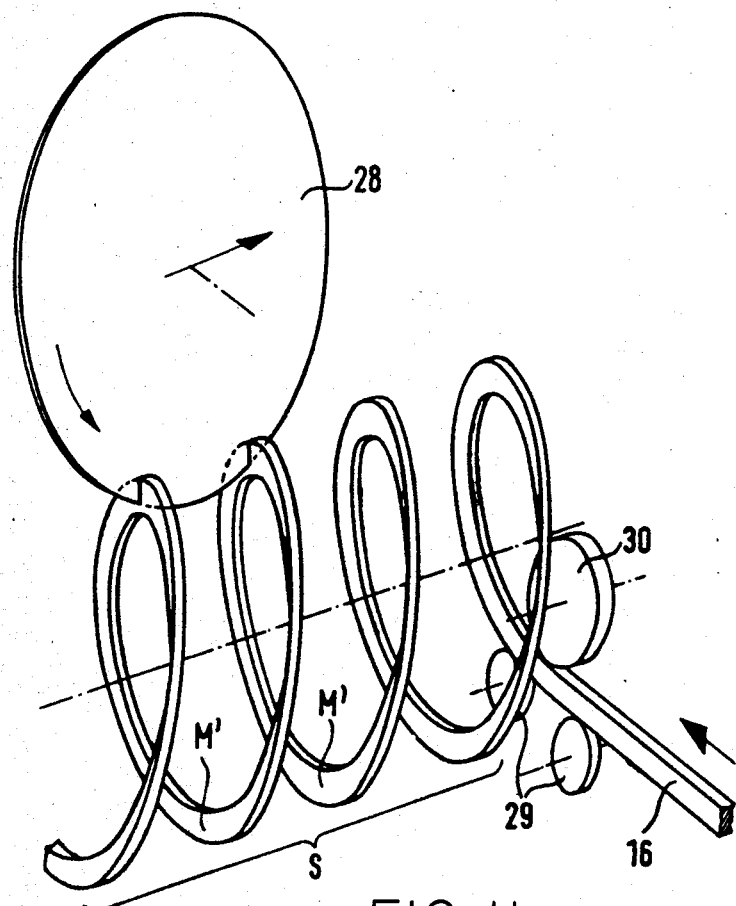
FIG. 11a  FIG. 11b
FIG. 11c

METHOD FOR MASS PRODUCING SUPERIMPOSED ANNULAR ELEMENTS OF A TUBULAR MANIFOLD OR COLLECTOR VESSEL OF A HEAT EXCHANGER

FIELD OF THE INVENTION

The invention relates to a method for mass producing a tubular manifold or collector vessel of a heat exchanger in which a plurality of tubes of a matrix have ends secured to the manifold for communicating with the interior thereof for conveying fluid between the tubes and the manifold. The manifold is constituted by a plurality of superimposed annular elements which are secured together and which are formed with recesses for receiving the ends of the tubes.

PRIOR ART

U.S. Pat. Nos. 3,746,083 and 4,036,293 disclose heat exchangers which essentially comprise a tubular manifold or central collector within which are two separated air ducts. The heat exchanger further comprises a matrix of U-shaped tubes which extend substantially radially from the manifold. In operation of the heat exchanger, the tube matrix is bathed by hot gases. Relatively cool air under pressure is introduced into one of the ducts within the manifold and the air flows through the tubes of the matrix whereby the air is heated, and the heated air is discharged into the other duct in the manifold, from which it can then be fed to a utilization means.

In another construction of this type, instead of a common manifold for the two separated ducts, individual tubular collector vessels are arranged substantially parallel and adjacent one another, one collector vessel serving exclusively for the supply of the cold pressure air into the tube matrix while the other collector vessel serves exclusively for the discharge of the heated pressure air to the corresponding utilization means.

In the known heat exchangers the collector vessels are provided with apertures for receiving the ends of the tubes of the tube matrix and the tubes are brazed or welded to the collector vessels.

Federal Republic of Germany No. OS 33 10 061 (U.S. patent application Ser. No. 551,725, now U.S. Pat. No. 4,597,436) discloses the formation of the collector vessel from a plurality of individual annular elements which are superimposed on one another and joined together. In this construction, the annular elements are suitably preprofiled and when the elements are superimposed on one another openings are formed for the insertion or connection of the individual tubes of the matrix. Each such preprofiling provides a suitable recess in the annular elements which corresponds to the external configuration of the end of the matrix tube. This construction is not concerned with suitable mass production of the annular elements. Furthermore, there is only a general disclosure as to the formation of the recesses by deformation of the material of the annular elements, for instance, by coining, stamping or rolling.

In addition to the formation of the recesses for receiving of the matrix tubes, it is also important to exercise a comparatively large amount of care with respect to the subsequent brazing in place of the ends of the matrix tubes. In this regard, close tolerances have to be taken into consideration, and therefore, for instance, non-uniform brazing structures must be avoided in the interest of high reliability in operation. It is furthermore important that the mating surfaces of the annular elements be suitably prepared to insure accurate assembly of the collector vessel. Additionally, different high temperature gradients must be taken into consideration, particularly in the region of the connection of the matrix tubes to the annular elements of the collector vessel and suitable compensation for these temperature gradients should be provided by cutouts or different contouring of the material of the annular elements. Furthermore, local rigidity and thermal expansion must be taken into account in such heat exchangers.

All the criteria mentioned above, particularly with respect to the subsequent finished heat exchanger, can be realized only with extreme difficulty in the event of mass produced manufacture of the annular elements of the heat exchangers.

SUMMARY OF THE INVENTION

An object of the present invention is to provide a method by which annular elements of the collector vessel of a heat exchanger of the aforementioned type can be manufactured by mass production in a comparatively simple and economical manner.

The above and further objects of the invention are achieved by a method which comprises cutting strips of material to a predetermined length for the formation of respective annular elements of the manifold and connecting the ends of each strip of material to form a ring-shaped element having upper and lower planar surfaces and inner and outer peripheral edges. The ring-shaped element is then passed between rollers in a first rolling operation to produce local displacement of material at the inner and outer peripheral edges of the ring-shaped element. Thereafter, the ring-shaped element is subjected to a second rolling operation in which the material of each element is formed with a plurality of recesses concurrently in at least one of the planar surfaces of the element for receiving the ends of the tubes of the matrix when the elements are superimposed on one another.

In one embodiment of the invention, the material is cut to predetermined length in flat strips each of which is then formed to ring shape and its ends are welded together.

In another embodiment, the material is wound into a continuous coil shape having a succession of windings and the windings are axially cut to form the respective individual strips whose ends are then welded together to form the ring-shaped elements.

The invention also contemplates apparatus for carrying out the method comprising means for cutting strips of material to predetermined length, each strip corresponding to a respective annular element of the manifold and means for connecting ends of each strip of material to form a ring-shaped element having upper and lower planar surfaces and inner and outer peripheral edges. The apparatus further comprises roller means for rolling the ring-shaped elements to form recesses in at least one of the planar surfaces thereof for receiving the ends of the tubes of the matrix. The roller means includes a roller comprising a cylindrical core and a plurality of profiling segments on the core projecting with rotational symmetry around the core, said segments being spaced axially on said core and being shaped to produce said recesses with shapes at locations for receiving the tubes of the matrix when the elements are superimposed on one another to form the manifold.

The invention will be described hereafter in relation to specific embodiments thereof with reference to the attached drawing.

BRIEF DESCRIPTION OF THE FIGURES OF THE DRAWING

FIG. 3 diagrammatically illustrates a first embodiment for supplying and cutting strips to length for mass production of annular elements of the collector vessel of the heat exchanger.

FIGS. 4a–4e are cross-sectional views of different embodiments of the strips of FIG. 3.

FIG. 5 diagrammatically illustrates apparatus for bending a strip of material into ring shape.

FIG. 10 is a schematic top plan view of the ring which has been deformed during the first rolling operation, with further illustration of deformation of the ring after a second rolling operation.

FIG. 11a is a perspective view diagrammatically showing a first stage in an alternate process for forming ring-shaped elements.

FIG. 11b shows a ring-shaped element obtained from the process in FIG. 11a.

FIG. 11c is a perspective view diagrammatically showing another process for forming the element of FIG. 11b.

FIG. 12 is an elevational view of a pair of profiling rollers for performing the second rolling operation on the ring-shaped element.

DETAILED DESCRIPTION

The invention will be described with reference to a heat exchanger which is diagrammatically illustrated and which shows only those parts necessary for an understanding of the invention.

Figure 1:
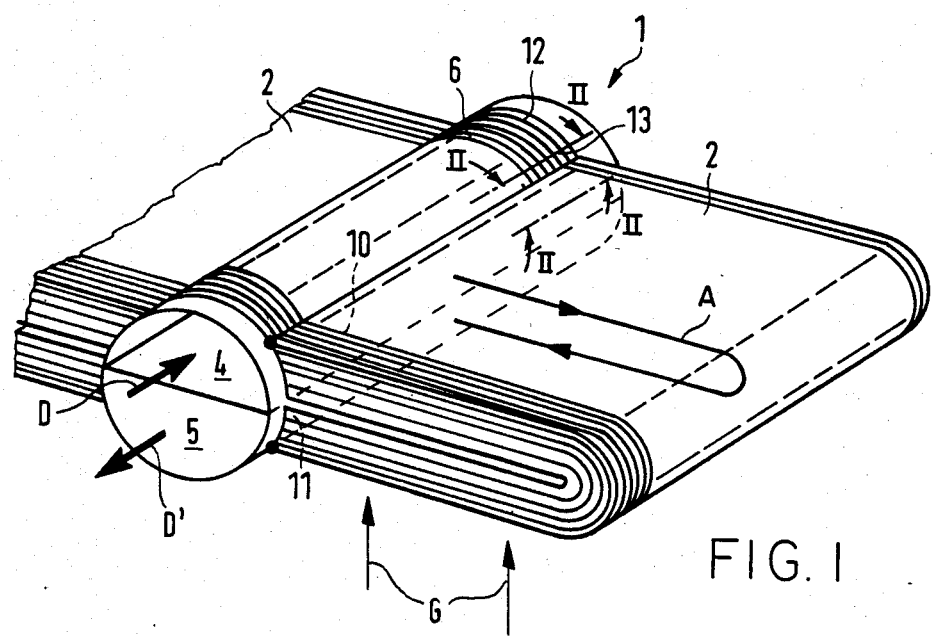
FIG. 1 is a perspective view diagrammatically illustrating a profiled-tube heat exchanger adapted for manufacture by the invention.

In FIG. 1 there is seen a heat exchanger 1 which is constructed to convey fluid, such as two gases along respective separate paths so that one fluid can exchange heat with the other fluid. The heat exchanger 1 is suitable for manufacture by the method and apparatus of the invention.

The heat exchanger 1 comprises a matrix or array 2 of tubes 3 through which one of the fluids flows along a path A while the second fluid G flows over the outside of the tubes of the matrix 2. Conventionally, the second fluid G is composed of hot gases while the fluid flowing in the tubes is pressurized air which is heated by the hot gases.

Figure 2:
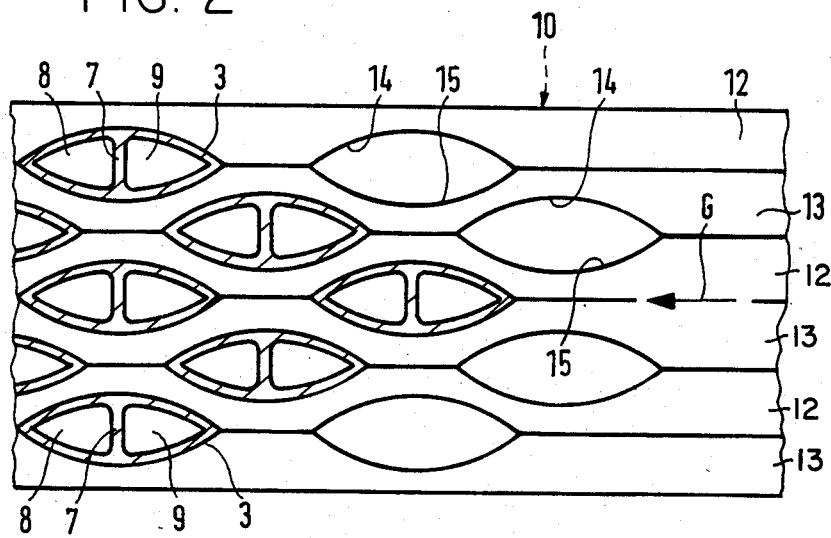
FIG. 2 is a circumferential cross-section taken along the periphery of the collector vessel of the heat exchanger on curved plane II—II in FIG. 1 and in which selected tube openings in the collector vessel have been left empty for purposes of explanation.

The tubes 3 of the matrix 2 are offset and interfitted in horizontal rows as shown in FIG. 2 and one of the ends of the tubes 3 are connected to a first duct 4 for supply of cold pressurized air D into the matrix while the other of the ends of the tubes 3 are connected to a second duct 5 from which heated pressurized air D' is discharged for supply to a utilization means (not shown). The ducts 4,5 are integrated in a common collector vessel or manifold 6 in separated relation. Both ducts can, however, also be associated with its own respective collector vessel or manifold.

Each tube 3 is of U-shape and the pressurized air flows from duct 4 radially outwards in a plane perpendicular to the manifold and the pressurized air flows back to the duct 5 of the manifold after having undergone a deflection of 180° in the U-shaped bend of the tube. The tubes 3 extend radially from the manifold over a great distance in order to achieve suitable heat exchange with the hot gases G flowing transversely over the tubes.

As seen in FIG. 2, the tubes 3 are elongated in cross-section and have a streamlined shape with pointed ends to facilitate smooth flow of the gases G around the tubes. The tubes 3 are offset in horizontal rows and are interfitted as shown in FIG. 2 to provide passageways for uniform flow of the hot gases around the tubes. Each tube 3 contains a divider 7 in the form of a web which defines approximately triangular flow passages 8, 9 which are separated from one another.

The tubes 3 of the matrix 2 are connected to the duct 4 of the manifold in a connection region 10 and to the duct 5 of the manifold in a connection region 11. The manifold is comprised of a plurality of alternating, superposed annular elements 12, 13 which are provided with respective opposed recesses 14, 15 to accurately and tightly receive the ends of the associated tubes 3. In FIG. 2 several of the recesses are shown without the tubes for illustrative purposes. After the ends of the tubes 3 of the matrix 2 have been inserted into the recesses of the annular elements of the manifold, the ends of the tubes can be brazed to the annular elements of the manifold.

The invention is basically directed to the manufacture of the annular elements 12, 13 of the collector vessel or manifold 6 and to the formation of the recesses 14, 15 for receiving the ends of the tubes of the matrix 2.

Figure 6:
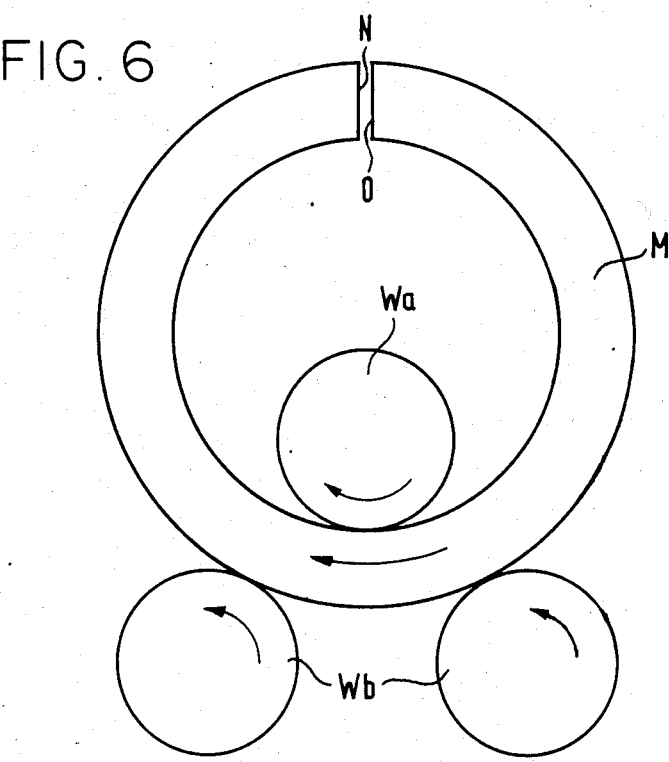
FIG. 6 shows the apparatus of FIG. 5 in a stage of operation where the strip of material is bent into ring shape.
Figure 7:
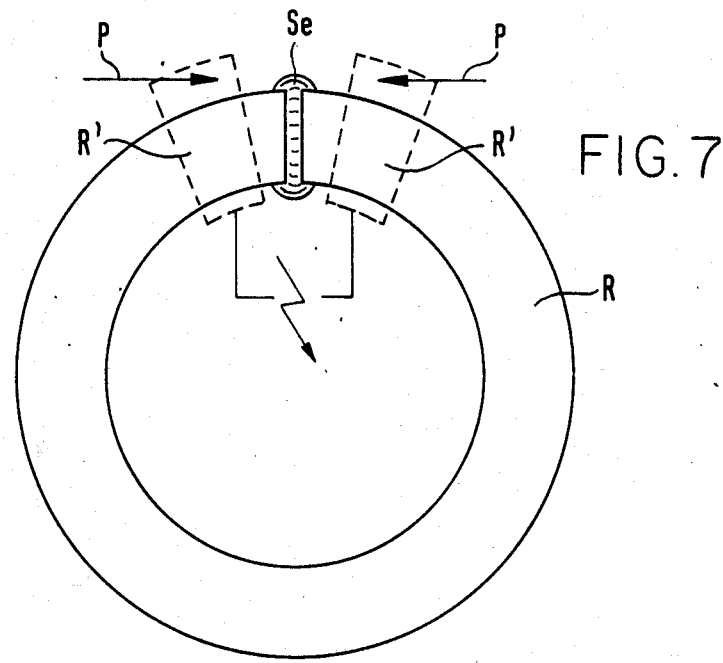
FIG. 7 diagrammatically illustrates apparatus for welding the bent strip of FIG. 6.

According to the invention, and with reference to FIG. 3, strips of material M are successively cut to length L from a roll of stock 16. The cross-section of the material of the stock can be of various shapes as exemplified by FIGS. 4a–4e. The strip M is bent into a ring shape, for example, by the use of rolls Wa and Wb in a rolling operation as shown in FIGS. 5 and 6. The strip M is bent by application of differential pressure from rolls Wa and Wb as shown in FIG. 5 with rotation of the rolls as shown in FIG. 6. The free ends N, O of the bent ring-shaped strips are welded together as shown in FIG. 7 at weld seam Se to form a ring R. The weld seam Se and the material R of the ring shaped strip in the region of the weld seam can be heat-treated, for example, by stress-free annealing in order to provide uniform strength properties for the ring R.

Figure 8:
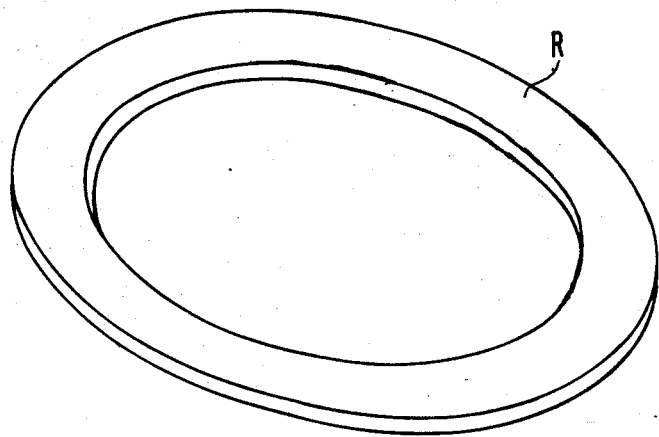
FIG. 8 is a perspective view of the ring-shaped element after one or more further shaping processes to bring the element to a thickness uniformly over the entire circumference.
Figure 9:
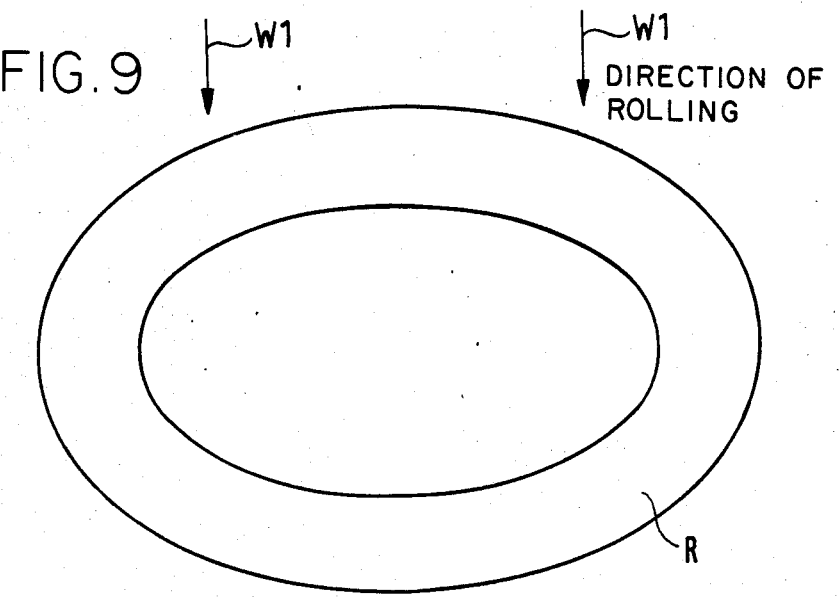
FIG. 9 is a diagrammatical top view of the ring of FIG. 8 after the ring has been elliptically pre-shaped before the commencement of a first rolling operation.

The ring R in FIG. 7 is compressed, for example, by rolling to have a uniform thickness as diagrammatically represented in FIG. 8. The ring can be given an elliptical outline as shown in FIG. 9 for reasons to be given later.

The ring R is now subjected to a stretch rolling operation by being rolled in the direction W1, between rollers (not shown) to produce local deformations of material VD at the inner and outer peripheral edges of the ring as shown in FIG. 10. At this stage, the ring has been deformed and it no longer has a uniform width as its inner and outer peripheral edges have been displaced by the deformation of material VD.

The deformed ring is next subjected to a rolling operation by being rolled in its plane in the direction W2 between rollers 18, 19 to simultaneously produce the recesses 14, 15 which are to receive the tubes 3 of the matrix 2. The recesses 14, 15 are formed in the wider portions of the deformed ring R produced by the stretch rolling operation. The rolling operations will be described in greater detail later.

FIGS. 11a and 11b show another mode by which the rings R can be formed. Referring to FIG. 11a, a length of material 16 is wound on a mandrel (not shown) to form a coil S with windings M' having substantially the same inner and outer diameters. The individual windings of the coil S are concurrently cut under the action of a cutting force T from a longitudinal cutter to form individual strips M' from the windings as seen in FIG. 11b. The strips M' are substantially of ring-shape with axially offset free ends N, O. The ends are subjected to axial forces, U, V to bring the ends into the plane of strip M' whereupon the ends are welded to produce a circular ring corresponding substantially to that shown in FIG. 7.

Referring to FIG. 11c, therein it is seen that the individual windings M' can be cut by a cutting wheel 28 which rotates and is moved in axial direction during the cutting operation. The strip 16 passes through guide and bending rolls 29, 30 to produce the coil S.

The ring R from FIG. 7 or that produced from the strip M' in FIG. 11b is subjected to rolling to form the substantially planar ring of circular shape as in FIG. 8 with a desired thickness. The rolling operation can be carried out by shaping rollers which also can produce stretch rolling in the circumferential direction of the ring as well as in the rolling direction W1 in the plane of the ring.

The stretch rolling, as well as the shaping of the material by rolling, has the advantage over other shaping operations, such as embossing or stamping in a die, that the surfaces of the shaping tools roll on the material to be shaped and in this regard can displace the material locally by different amounts without jamming due to substantial frictional contact, as would be the case of contact between shaping tools and the workpiece over large areas.

In further accordance with the process, the recesses 15 can be concurrently formed in one of the planar surfaces of the rings by upward and/or downward displacement of material, as well as three-dimensional displacement with respect to one another, and preferably the recesses can be concurrently formed in the opposite planar surfaces of the rings by rolling the rings between rollers 18, 19 in the rolling direction W2. In this way, with the use of the apparatus to be described later, it is possible to produce the recesses 14, 15 in association with the flat surfaces 20 and 20' by which each ring mates with its adjacent rings upon assembly of the manifold 6.

The rollers 18, 19 have parallel rotational axes and the ring R is advanced in rolling direction W2 between the rollers 18, 19 in order to produce the recesses 14, 15 in the ring. The roller 18 has a cylindrical core with a plurality of axially spaced profiling segments 22 projecting from the core with rotational symmetry. The roller 19 has axially spaced profiling segments 23 projecting from its core with rotational symmetry. The segments 22, 23 are axially spaced on their cores and shaped to produce recesses 14, 15 at the locations where the rings will receive the ends of the tubes when the rings are superimposed on one another to assemble the manifold 16.

Advantageously, prior to the formation of recesses 14, 15 in the second rolling stage W2, the ring R is formed, at the lateral boundaries of the region where the recesses 14, 15 are to be formed, with bulges or shaped corrugations 17 at one planar surface. The bulges 17 serve to compensate for impermissible displacements of material as a result of non-uniformly distributed pressing forces from the two rollers 18, 19. This feature is of particular importance in the edge regions a as hereat the material of the ring R would have the freedom of transverse stretching in the absence of a profile contour or application of opposing force on the opposite surface of the ring R. This is in contradistinction to the central region where the grooves between the segments of the rollers interfit with opposing segments 22, 23 so that the material is engaged at both surfaces of ring R whereby there is a balancing of the shaping forces in this central part. By means of the shaped bulges 17, shaping errors in the edge regions a caused by transverse stretching due to deformation of material at adjoining recesses 15 be eliminated, as can impermissible overstretching of material.

The impermissible stretching of material and the shaping errors can also be eliminated by providing local annular recesses 24 in the outermost segments 22 of roller 18 as shown in FIG. 12 in dotted outline. As a consequence, it has been found by experiment that no displacement of material which would impair the desired trueness to shape of the ring R or of the recesses 15 takes place.

A final calibration of the dimensions of the ring, the recesses 14, 15 therein and of the mating surfaces 20 can be obtained by effecting a further calibrating rolling operation in the direction W2' between grooved rollers similar to rollers 18, 19 but whose shaping grooves are geometrically precise by being produced by very accurate contouring methods such as numerically controlled methods.

In this way, the mating surfaces 20 of the rings R and the corresponding recesses 14 and 15 are accurately shaped and located so that upon assembly of the finished rings or annular elements 12,13 the adjoining recesses 14 and 15 will be in registry and will tightly conform to the tubes of the matrix 2. This will have an extremely favorable effect on the brazing of the ends of the tubes to or between the rings 12, 13.

According to a feature of the invention, the ring R of FIG. 7 which is produced by welding is subjected to an operation before the stretch-rolling in the direction W1 takes place. Namely, the ring R is subjected to a deformation which will compensate for any undesired deviation from the desired circular ring shape caused by the stretch-rolling in the direction of W1. Thus, as shown in exaggerated fashion in FIG. 9, the ring R can be intentionally deformed to elliptical shape or to an eccentrically deformed shape to compensate for any deformation so that a desired circular contour is obtained on the ring after the stretch-rolling operation is completed.

According to another feature of the invention, after the ring has been subjected to the second rolling operation in direction W2 or the subsequent calibration rolling W2', the ring can be trimmed in a stamping press so that the inner and outer peripheral surfaces will be circular as shown at surfaces K in FIG. 10. In this way, the displaced material VD intentionally produced in the stretch-rolling process can be eliminated in the final shape of the ring. Moreover, any other undesired deformations caused by the preceding deformation processes can be eliminated by trimming in the stamping press.

Simultaneously with the trimming of the ring, the mating surfaces can be formed with guides and recesses to facilitate the assembly of the rings into the manifold. Additionally, local accumulation or reduction of material can be effected to eliminate high temperature gradients and heat expansion stresses produced in the material during use of the heat exchanger. In this way it is therefore possible to adapt the cross section of the manifold 6 to locally different thermal and force stresses. For example, with differently stamped ring thicknesses or ring diameters, the desired thermal and assembly criteria can be met. Furthermore, temperature gradients which occur in the annular elements of the subsequently formed manifold 6, especially in the case of non-uniform heat exchanger operation, can at least partially be compensated.

Referring again to FIGS. 6 and 7, the two ends N, O of the strip material M are pressed against each other under pressure P for or during the welding. The welding can be by electric flash butt welding or resistance welding. The welding operation is symbolically indicated in FIG. 7.

In a further development of the invention, it is also possible to subject the ring before any one or more of the rolling operations i.e., the bend rolling of FIG. 6, the stretch rolling of FIG. 9 or the material shaping rolling of FIGS. 10 and 12 to at least one suitable shaping operation such as forging, embossing, hot-pressing or the like. The ring R after welding (FIG. 7) can be subjected, before the commencement of the stretch rolling operation for example in the direction W1 in FIG. 9 to a heat treatment, for instance stress-free annealing at the weld seam Se and in the regions R1 close to the weld seam. It may also be advantageous if the ring R produced by welding (FIG. 7) is subjected simultaneously, in the course of the aforementioned heat treatment, or directly thereafter, to a forging operation in order to further improve the structural uniformity. The heat treatment and/or forging can advantageously be carried out uniformly or non-uniformly over the ring circumference, depending on the desired deformation or strength properties.

In another development of the invention, several stepwise alternately successive intermediate annealing or rolling operations can also be asociated with at least one of the rolling steps in order to adapt the deformations and crystal structure optimally to the required physical properties of the final ring, for example by hardening. In order to substantially facilitate the assembly and fluid-tight connection of the annular elements 12, 13 in the formation of the manifold 6, the mating surfaces 20, 20' of the ring-shaped elements R (FIG. 10), which form the annular elements 12, 13, are treated so that, for example, upon heating of the individual ring-shaped elements while they are held together, they are connected or sintered together in fluid-tight relation with structural homogeneity at their parallel opposite contact surfaces. This is in addition to the use of suitable pressure sintering methods, optionally with the use of vacuum molds.

In one embodiment, the mating surfaces 20, 20' can, in an intermediate operation in the sequence of shaping steps or simultaneously therewith, be mechanically machined and/or metallurgically activated to achieve fluid tight connection at the joints between adjacent annular elements. This can also be effected by an additional or singular chemical or electromechanical activation or an activation in a electric field of the mating surfaces.

In one embodiment, simultaneously with the stretch-rolling operation W1 of the closed ring R or simultaneously with the final calibration rolling operation W2', additional material for the subsequent joining of the annular elements 12, 13 is supplied to the mating surfaces. The additional material can be in the form of a coating on the elements or supplied by a wire or the like. The additional material can be applied by coating the elements of the mating surfaces and calibrating the thickness of the layers by deposit in an electric field.

According to one advantageous method, the additional material is applied as a powder material which is compacted, in situ, for instance, during the stretch-rolling operation or during the calibration rolling operation W2'. The powder can be applied electrostatically onto the mating surfaces by spraying, immersion sintering, pressure or rubbing.

Referring again to FIG. 12, it should be noted that when bulges 17 are formed on ring-shaped elements R these can be utilized as guide surfaces for the rollers, for example, roller 18 in FIG. 12, in which case the roller 18 is provided with coaxial recesses 25 shaped to the contour of the bulges. The roller 19, in this arrangement, is provided with shaped annular projections 27 for engaging the bulges 17 whereby the annular element is guided by rollers 18 and 19.

Although the invention has been disclosed in relation to specific embodiments thereof, it will become apparent to those skilled in the art that numerous modificatins and variations can be made within the scope and spirit of the invention as defined in the attached claims.

What is claimed is:

1. A method for mass producing a tubular manifold or collector vessel of a heat exchanger in which a plurality of tubes of a matrix have ends secured to the manifold for communicating with the interior thereof for conveying fluid between the tubes and the manifold, the manifold being constituted by a plurality of superimposed annular elements which are secured together and which are formed with recesses for receiving the ends of the tubes, said method comprising cutting strips of material to pre-determined length,
forming open rings from said strips in which each open ring has free ends,
connecting said free ends of each open ring to form a continuous ring-shaped element having upper and lower planar surfaces and inner and outer peripheral edges,
stretch-rolling each ring-shaped element to produce local deformation of the material at the inner and outer peripheral edges of the ring-shaped element, and
effecting a further rolling on each ring-shaped element to produce a plurality of recesses concurrently in at least one of the planar surfaces for receiving the ends of the tubes of the matrix.

2. A method as claimed in claim 1 wherein the further rolling produces said recesses where the local deformation of material has been produced by said stretch-rolling.

3. A method as claimed in claim 1 wherein prior to said further rolling, each ring-shaped element is subjected to the step of forming bulges in the material at the lateral edges of the region where the recesses are to be formed.

4. A method as claimed in claim 1 wherein before said stretch rolling, said ring-shaped element is deformed in order to compensate for subsequent out-of-round deformation of the element when subjected to said stretch rolling.

5. A method as claimed in claim 1 comprising effecting a plurality of stepwise, alternating, successive intermediate annealing or rolling operations in association with at least one of said stretch-rolling or further rolling steps.

6. A method as claimed in claim 1 wherein said ring-shaped elements have portions on said upper and lower surfaces which contact corresponding portions of adjacent elements, said method further comprising mechanically machining said portions to faciliate subsequent connection with the adjacent elements.

7. A method as claimed in claim 1 wherein said ring-shaped elements have portions on said upper and lower surfaces which contact corresponding portions of adjacent elements, said method further comprising chemically or electrochemically activating said portions for subsequent metallurgical connection of said ring-shaped elements at said portions.

8. A method as claimed in claim 1 wherein the material is cut to pre-determined length in flat strips each of which is then, formed to ring-shape.

9. A method as claimed in claim 8 wherein said free ends are connected by welding, said free ends being pressed together.

10. A method as claimed in claim 9 wherein said welding is electrical flash-butt welding, electron beam welding, laser welding, high frequency arc welding or resistance welding.

11. A method as claimed in claim 8 wherein said free ends are connected by welding, the method further comprising heat treating the weld and the material in the region thereof before said stretch-rolling.

12. A method as claimed in claim 11 wherein said ring-shaped strips are subjected to preliminary forging during or after said heat treating.

13. A method as claimed in claim 1 wherein the strips of material of pre-determined length are formed by winding the material into a continuous coil shape having a succession of windings and axially cutting said windings to form respective individual strips.

14. A method as claimed in claim 13 wherein said windings are cut simultaneously to form said strips.

15. A method as claimed in claim 1 wherein said further rolling is effected by rollers which rotate around axes parallel to the plane of the ring-shaped element.

16. A method as claimed in claim 15 wherein the recesses are concurrently produced by said rollers in both the upper and lower planar surfaces of each said ring-shaped element.

17. A method as claimed in claim 1 comprising trimming the inner and outer peripheral edges of each ring-shaped element to circular shape in a stamping press after said further rolling.

18. A method as claimed in claim 17 comprising producing local deformation of material of said ring-shaped elements by said stamping press concurrently with the trimming of the inner and outer peripheral edges.

19. A method as claimed in claim 1 comprising effecting a shaping operation on said ring-shaped elements before at least one of said rolling steps.

20. A method as claimed in claim 19 wherein said shaping operation comprises forging, embossing or hot pressing.

21. A method as claimed in claim 1 wherein said ring-shaped elements have portions on said upper and lower surfaces which contact corresponding portions of adjacent elements, said method further comprising supplying additional material to the ring-shaped elements at said portions.

22. A method as claimed in claim 21 wherein said additional material is applied by coating the material.

23. A method as claimed in claim 22 wherein the thickness of the additional material is calibrated by deposit of layers in an electrical field onto said portions.

24. A method as claimed in claim 21 wherein said additional material is a powder which is applied electrostatically and compacted on said portions during the application of rolling forces.

* * * * *